April 11, 1967 W. R. AIKEN 3,313,885

COMBINED TONE CONTROL AND VOLUME EXPANDER ARRANGEMENT

Filed May 21, 1963 3 Sheets-Sheet 1

INVENTOR.
WILLIAM ROSS AIKEN
BY

April 11, 1967 W. R. AIKEN 3,313,885

COMBINED TONE CONTROL AND VOLUME EXPANDER ARRANGEMENT

Filed May 21, 1963 3 Sheets-Sheet 2

COMBINED TONE CONTROL AND VOLUME EXPANDER ARRANGEMENT

Filed May 21, 1963 3 Sheets-Sheet 3

United States Patent Office 3,313,885

Patented Apr. 11, 1967

3,313,885

COMBINED TONE CONTROL AND VOLUME EXPANDER ARRANGEMENT

William R. Aiken, 10410 Magdalena Ave., Los Altos Hills, Calif. 94022

Filed May 21, 1963, Ser. No. 281,946
4 Claims. (Cl. 179—1)

This is a continuation-in-part of my U.S. patent application Ser. No. 5,903, filed on February 1, 1960, for an electronic arrangement.

The present invention relates to tone control and volume expander arrangements of sound reproducing apparatus, and aims to provide a combined tone control and volume expander arrangement that expands selected portions of an applied audio signal to different degrees so as to create a reproduction of the signal that is pleasing to the listener at all volume levels.

The human ear is less perceptive of the high and low frequencies of the audio range at low volume levels than at medium and high volume levels, as demonstrated by the Fletcher-Munson Contours of Equal Loudness. Hence, a musical composition that is originally produced at a high volume level in a large room, such as a music hall, sounds poorly when reproduced at a substantially lower volume level in a private home, because at the lower volume level the human ear may scarcely hear the high and especially the low frequencies of the audio range while the middle register frequencies are still clearly audible. In apparatus adjusted to perform at low volume levels, the manually adjustable bass and treble control means are therefore usually set for extra gain, with the result that whenever the volume level of a composition rises, or the general volume level of a reproduction is intentionally raised, the amplification of the low and high frequency sounds becomes excessive and results in excessively booming bass notes, shrill treble notes and excessive emphasis of distortions introduced in the recording of the original composition. The same is true for conventional expander systems designed to restore the initial dynamic volume range of a transmitted or recorded performance. When recording a musical composition, a speech, a lecture and the like, the initial dynamic volume range of the performance is usually substantially reduced in order that the sound recording, transmitting and/or reproducing apparatus may be able to handle the variations in volume without exceeding the power and/or distortion limits of the system. When such a compressed recording or transmission is reproduced through a conventional expander arrangement to restore its full dynamic volume range, its high and low frequencies becomes frequently unpleasantly noticeable at high volume levels.

It is an object of my invention to provide a tone control arrangement that acts as an expander to restore the initial dynamic volume range of a transmitted or recorded performance but expands the low and high frequencies of a reproduction at high volume levels to a significantly lesser degree than the middle frequencies to avoid shrill trebles and excessively booming bass notes.

This and other objects of the present invention will be apparent from the following description of the accompanying drawings which illustrate certain preferred embodiments thereof and wherein FIGURES 1 and 2 are block diagrams illustrating different embodiments of the invention;

Figure 1:
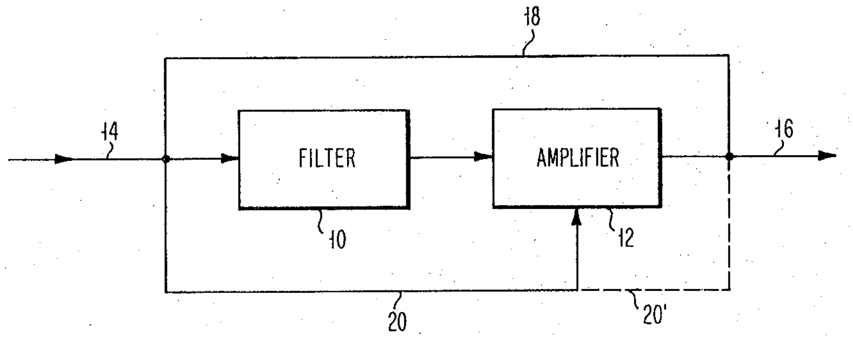

Having first reference to FIGURE 1, a filter 10 and a variable gain amplifier 12 are connected in series between the input means 14 and the output means 16 of the combined tone filter and expander arrangement of the invention, and both said filter and said amplifier are shunted by a by-pass line 18 as shown. The filter 10 is arranged to pass the middle frequencies of the audio range to the amplifier 12 while substantially attenuating the high and low frequencies of the said range. However, all the frequencies of a signal applied to the input means 14, may reach the output means 16 of the arrangement without change along the by-pass line 18. The amplifier 12 is initially set to provide a minimum degree of amplification and its performance is controlled by a gain-increasing voltage that is derived from the signal applied to the input means of the arrangement, as schematically indicated by the line 20.

Figure 5:
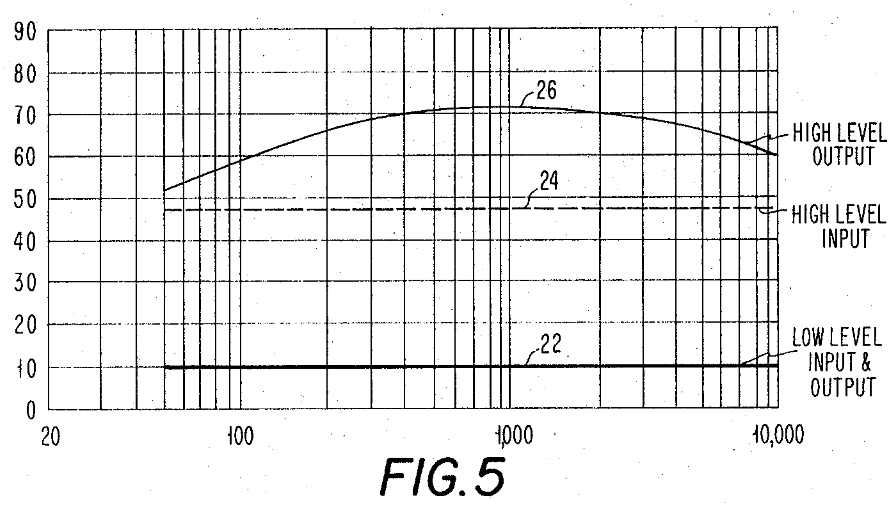
FIGURE 5 is a chart illustrating the performance of the embodiments of the invention represented by FIGURES 1 and 3, at different volume levels.

When employing the arrangement illustrated in FIGURE 1 in practice, the treble and bass control means ordinarily provided in the apparatus in which the arrangement of the invention is employed, are preferably set to give maximum emphasis to the high and low frequencies of the audio range. When a weak signal arrives at the input means of the arrangement, the middle register frequencies experience little amplification since the amplifier 12 is initially set for minimum gain as pointed out hereinbefore, and since the gain-increasing control voltage applied to the amplifier through line 20 is weak. The signal emerging at the output end of the arrangement is, therefore, practically identical with the signal applied to its input means as illustrated by the single line 22 in FIGURE 5 which represents both, a low volume signal applied to the arrangement of the invention and the characteristic of the arrangement at low volume levels. As the strength of the signal increases, however, the control voltage applied to the amplifier 12 increases correspondingly. As a result thereof, the volume of the middle register frequencies in the output signal increases disproportionately, i.e., to a larger extent than the increase in volume exhibited by the low and high frequencies of the output signal. Said low and high frequencies may increase in direct relation to the increased volume of the incoming signal but will usually increase at a somewhat greater rate since the filter 10 attenuates but does not entirely suppress the high and low frequencies of the range. In FIGURE 5 the broken line 24 represents a high volume signal applied to the input means of the described tone control arrangement and the full line 26 represents the signal appearing at the output side of the tone control arrangement of the invention. A comparison of said lines indicates that the tone control arrangement of the invention operates as an expander, but expands the middle frequencies of the range to a disproportionately greater degree than the low and high frequencies so that the expanded reproduction is free from shrill treble notes and excessively booming bass notes, and thus is pleasing to the listener.

Figure 2:
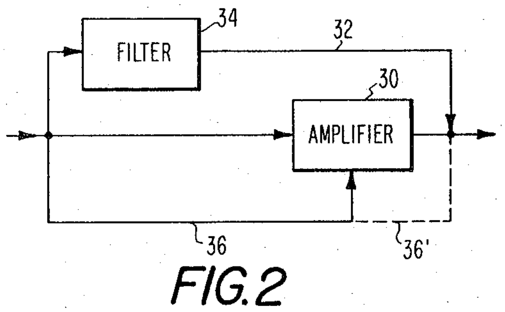

The embodiment of the invention illustrated in FIGURE 2 comprises an amplifier 30 to which all frequencies of the incoming signal are supplied and which provides a minimum of amplification as long as the applied signal is of low volume. Shunted across the amplifier 30 is a by-pass line 32 containing a filter 34 that is arranged to pass the high and low frequencies of the audio range while substantially attenuating the middle frequencies of said range. The amplifier 30 is controlled by a gain-increasing voltage derived from the incoming signal as indicated by the line 36, so that the gain of said amplifier increases as the strength of the incoming signal increases.

As in the embodiment of the invention illustrated in FIGURE 1, the treble and bass control means ordinarily provided in the apparatus in which the arrangement of the invention is employed, are preferably set to give maximum emphasis to the high and low frequencies of the audio range. Whenever a weak signal is supplied to the input means of the arrangement, the gain of amplifier 30 is at its minimum, and most of the signal developed at the output end of the arrangement is supplied through the by-pass line 32 and only a minor portion of the volume strength of the output signal is due to that part of the signal which passes through the amplifier. Hence, when a weak signal arrives, the volume of the high and low frequencies developed at the output end of the arrangement will be significantly higher than that of the middle register frequencies so that a listener will hear substantially all of the frequencies of the signal with equal clarity. As the volume of the incoming signal increases, however, the amplification provided by the amplifier 30 increases and an increasingly larger portion of the signal at the output end of the arrangement is therefore supplied by the amplifier 30. As a result thereof, the response curve of the output signal flattens out progressively as the strength of the incoming signal increases and may come close to a horizontal line at high volume levels of the incoming signal. This means that the described system operates as an expander which expands the middle frequencies to a disproportionately greater degree than the high and low frequencies of the range. Hence, the initial setting of the manually operable treble and bass control means results at no time in excessive volume levels of the high and low frequencies even though the total volume level of the signal may have substantially increased.

In the embodiments of the invention illustrated in FIGURES 1 and 2, the control voltages have been described and represented as derived from the incoming signal at the input side of the arrangements. It will be understood that appropriate control voltages may also be derived from the signal at the output end of the arrangement, as indicated by the broken lines 20′ and 36′ respectively in FIGURES 1 and 2.

Figure 3:
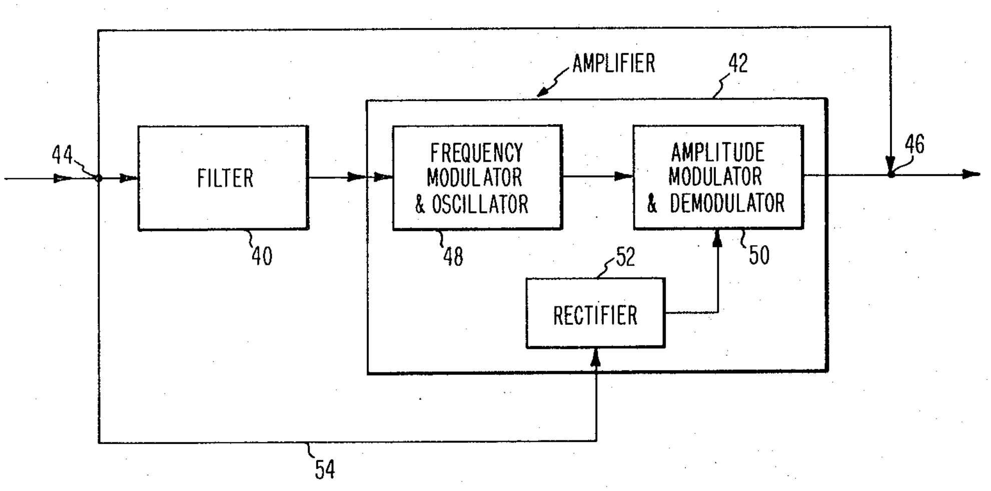
FIGURE 3 is a more detailed block diagram of an embodiment of the invention similar to the embodiment illustrated in FIGURE 1.

I have obtained especially satisfactory results with the tone control arrangement illustrated in FIGURE 3. This tone control arrangement is similar to the tone control arrangement illustrated in FIGURE 1 but employs the particular variable gain amplifier disclosed in my U.S. Patent 2,923,887, issued on Feb. 2, 1960. In the amplifier described in said patent the signal whose volume is to be controlled, is modulated in a first manner of modulation upon a carrier frequency generated by a local oscillator, and the modulated carrier is then modulated with an amplification-level-determining control voltage in a second manner of modulation, whereupon both modulations are simultaneously separated from the carrier to reproduce the signal at a volume level determined by said control voltage.

Having reference to FIGURE 3, the tone control arrangement illustrated therein comprises a filter 40 arranged to pass the middle register frequencies of the audio range while attenuating the high and low frequencies of said range, and the above described amplifier which is represented by the large block 42. The filter 40 and the amplifier 42 are connected in series between the input means 44 and the output means 46 of the arrangement. Shunted across both the filter 40 and the amplifier 42 is a straight by-pass line 47. In the amplifier 42 the frequencies passed by the filter 40 are delivered to a combined frequency modulator and oscillator represented by the block 48 wherein they are frequency-modulated upon the carrier generated by the oscillator, and the frequency-modulated carrier is delivered to a combined amplitude modulator and demodulator (for instance, a Foster-Seely demodulator) represented by the block 50. At 50 the frequency-modulated carrier is amplitude-modulated by a positive voltage derived through a rectifier 52 from the input side of the arrangement as schematically indicated by the line 54, and the doubly-modulated carrier is then demodulated with regard to both modulations. At the output end of the arrangement the demodulated signal which has a volume level determined by the control signal delivered to the amplitude-modulating part of station 50, is mixed with that part of the signal which reaches the output end of the arrangement along the by-pass line 47, to produce a composite output signal of appropriate tonal balance. The embodiment of the invention illustrated in FIGURE 3 operates therefor in a manner similar to the embodiment illustrated in FIGURE 1. At high volume levels it expands the middle frequencies of a signal applied to its input means to a disproportionately greater degree than the high and low frequencies of the signal. In this manner loud phases of a reproduced signal display seemingly the full dynamic volume range of the initial performance without being accompanied by shrill trebles and/or excessively booming bass notes.

Figure 4:
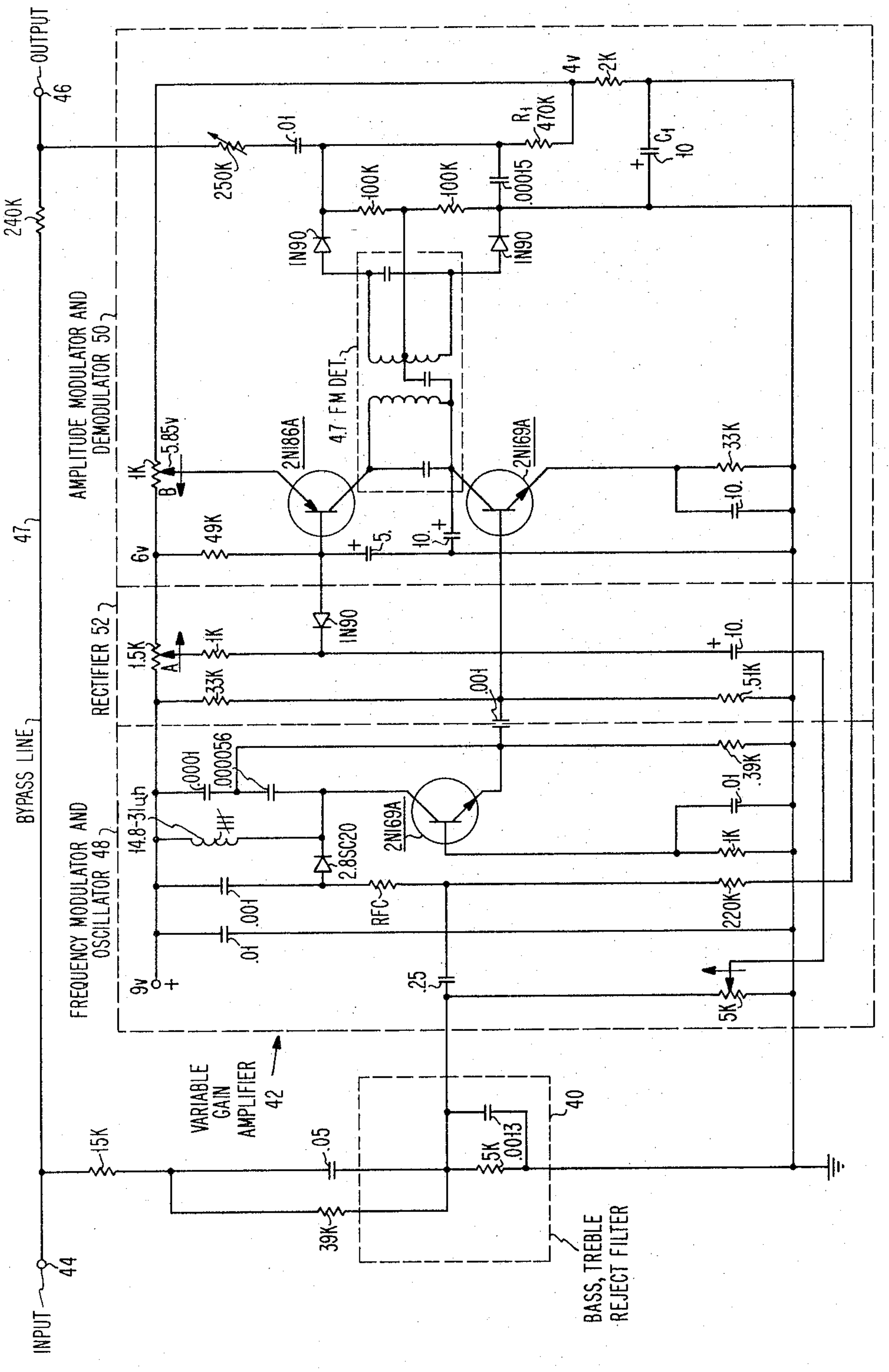
FIGURE 4 is a circuit diagram illustrating details of the embodiment of the invention represented by FIGURE 3.

FIGURE 4 constitutes the complete circuit diagram for the arrangement shown in block form in FIGURE 3, with the portions thereof corresponding to the blocks of FIGURE 3 enclosed in boxes drawn in broken lines.

Figure 6:
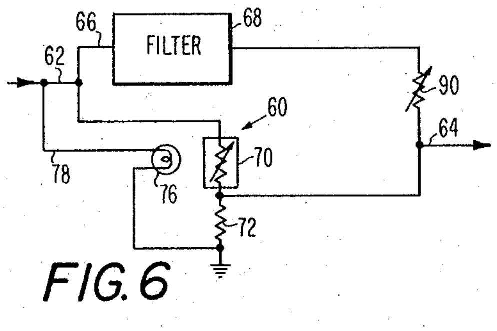
FIGURE 6 is a diagram illustrating yet another embodiment of the invention.
Figure 7:
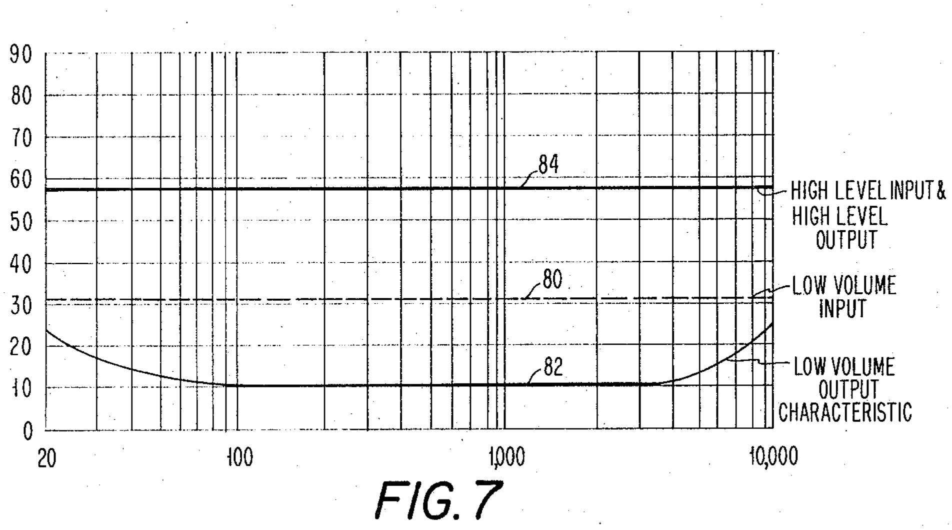
FIGURE 7 is a chart illustrating the performance of the embodiment of the invention represented by FIGURE 6.

The volume changing devices employed in the described embodiments of the invention have been referred to variable gain amplifiers. It should be noted, however, that the variable gain amplifier employed in the embodiment of the invention represented by FIGURE 3 and illustrated in detail in FIGURE 4, may be operated at gains of much less than unity depending upon its initial setting and the magnitude of the gain control voltage applied to its stage 50 from the rectifier 52. It may therefore actually operate as an attenuator for low level volumes of an applied signal and as an amplifier proper as the volume of the signal increases. In fact the combined volume expander and tone control arrangement of the invention may employ variable volume changing devices that operate at all times as attenuators and never reach a gain level of more than unity. Such an embodiment of the invention is illustrated in FIGURE 6. In said figure an attenuator 60 is connected between the input means 62 and the output means 64 and said attenuator is shunted by a by-pass line 66 which includes a filter 68 that is arranged to pass the high and low frequencies of a frequency range while attenuating the middle frequencies of said range. The attenuator is formed by two resistors 70 and 72 that are connected in series between the input means and ground; and the upper one of said resistors is a photo-sensitive resistor that is exposed to illumination by a lamp 76 whose degree of illumination is controlled by a voltage derived from the signal applied to the arrangement at the input side thereof as indicated by the line 78. When a low volume signal, such as represented by the broken line 80 in FIGURE 7, is applied to the input means 62, the illumination of the lamp 76 is dim and the value of the photo-sensitive resistor 70 is therefore high. As a result thereof the attenuator 62 attenuates all the frequencies of the signal very severely, but the high and low frequencies of the signal may pass through the filter 68 and reach the output means 64 without significant change. As a result thereof, the output characteristic of the arrangement for a low volume signal applied to its input means has the shape shown at 82 in FIGURE 7. As the volume of an applied signal increases, however, and causes the brightness of lamp 76 to increase, the value of the photo-sensitive resistor 70 decreases, and as a result thereof the voltage drop developed across resistor 72 and supplied to the output means 64 increases, but will never exceed the magnitude of the voltage of the input signal. Therefore, while the signal developed at the output means 64 of the arrangement and especially its medium frequencies, were substantially attenuated for low volume levels of an applied signal, the signal developed at the output means of the arrangement when the volume of the applied signal is relatively large, may not be attenuated at all as indicated by the line 84 which represents both a high volume signal applied to the input means of the arrangement, and the output characteristic of the arrangement for such high volume input signals. A comparison of the output characteristic 82 with the output characteristic 84 indicates clearly that the arrangement of the invention does not only control the tone quality of an applied signal but also acts as an expander although it employs a volume changing device that operates at no time as an amplifier in the narrow meaning of the word, because the volume level of the middle frequencies in the output signal increases at a much greater rate than the volume of the signal applied to the arrangement.

The described embodiment of the invention may comprise means in the form of a variable resistor 90 in series with filter 68 for appropriately proportioning the effect of the two parallel paths upon the signal formed at the output means 64 of the arrangement, and the extent to which the high and low frequencies of an applied low volume signal are attenuated by the arrangement of the invention may readily be predetermined by appropriate setting of the resistor 90.

The automatic tone control and expander arrangement of the invention may not only be employed in radio and television apparatus and in phonographs, but wherever high fidelity recording and/or reproduction of sounds is of importance, such as in telephone lines, in hearing aids and phonetic recordings of the type used for teaching public speaking, foreign languages, and the like.

While I have explained my invention with the aid of certain preferred embodiments thereof, it will be understood that the invention is not limited to the specific arrangements illustrated and described by way of example, which may be modified without departing from the spirit and scope of the invention.

I claim:

1. A volume expander and tone control arrangement comprising signal input and output means, a filter arranged to pass the middle frequencies of a range while attenuating the high and low frequencies thereof and a variable volume changing device connected in series between said signal input and output means, a by-pass line shunted across said filter and said volume changing device, and means for controlling the operation of said volume changing device with a gain increasing control voltage derived from the signal applied to the arrangement.

2. A volume expander and tone control arrangement comprising signal input and output means, a variable volume changing device connected between said input and output means, a filter arranged to pass the high and low frequencies of a frequency range while attenuating the middle frequencies thereof shunted across said volume changing device; and means for controlling the operation of said volume changing device with a gain-increasing control voltage derived from the signal passed through the arrangement.

3. A volume expander and tone control arrangement comprising signal input and output means, a variable attenuator connected between said input and output means, a filter arranged to pass the high and low frequencies of a frequency range while attenuating the middle frequencies thereof shunted across said attenuator, and means for decreasing the attenuation of said attenuator as the volume of a signal applied to the arrangement increases.

4. An automatic tone control arrangement comprising signal input and output means, a filter for passing the middle register frequencies of a range while attenuating the high and low frequencies thereof, and a variable gain amplifier set to provide minimum gain connected in series between said output and input means, said amplifier including an oscillator for generating a carrier frequency, a frequency modulator for frequency-modulating the frequencies passed by said filter onto said carrier frequency, means for deriving a volume-level-determining control voltage from the signal passed through the arrangement, an amplitude modulator for amplitude-modulating said frequency-modulated carrier frequency with said control voltage, and a demodulator for demodulating the doubly modulated carrier frequency with respect to both modulations and thus reproduce the frequencies passed by said filter at a volume level determined by said control voltage; and a by-pass line shunted across said filter and said variable gain amplifier.

References Cited by the Examiner

UNITED STATES PATENTS

| | | | |
|---|---|---|---|
| 1,993,861 | 3/1935 | Roberts | 179—1 |
| 2,253,186 | 8/1941 | Lowe et al. | 179—1.2 |

KATHLEEN H. CLAFFY, *Primary Examiner.*

R. MURRAY, *Assistant Examiner.*